United States Patent Office 3,393,082
Patented July 16, 1968

3,393,082
ALUMINO-SILICATE PIGMENT
Sanford C. Lyons, Bennington, Vt., and Daniel C. Brown, Dry Branch, Ga., assignors to Georgia Kaolin Company, Elizabeth, N.J., a corporation of New Jersey
No Drawing. Filed Oct. 12, 1965, Ser. No. 495,315
6 Claims. (Cl. 106—288)

ABSTRACT OF THE DISCLOSURE

Poorly crystallized, high viscosity kaolins can be blended with well crystallized, high viscosity kaolins to obtain a product having a viscosity significantly lower than that of either of the ingredients, their degrees of perfection of crystallinity being determined by the use of a crystallinity index based on the relative lengths of the exothermic peaks shown when respective kaolins are progressively heated to about 1000° C. in a Differential Thermal Analyzer unit.

---

This invention relates to the discovery of a new and improved alumino-silicate pigment for coating paper, having superior qualities of brightness, whiteness and the ability to produce exceptionally smooth and glossy coated surfaces with a minimum intensity of calendering, and further characterized by low viscosity at both low and high rates of hydraulic shearing. The improved pigment is produced by blending two types of kaolin products which have viscosities higher than normally desired or considered usable, a surprising result of the blending being that the resultant product has a viscosity lower than that of either of the components in addition to having other qualities desirable for use as a paper coating material. This result is obtained by mixing a naturally fine-particle but "poorly-stacked" kaolin with a "well-stacked" kaolin, both kaolins having viscosities which are normally considered unacceptable.

The term "well-stacked" is used to describe kaolin particles whose component atomic sheets are arranged in orderly configuration suggestive of a deck of playing cards. The terms "well-crystallized" and "well-ordered" are used as equivalents of "well-stacked." The correlation of kaolinite crystallinity with chemical and physical properties of kaolins is discussed in two papers by H. H. Murray and S. C. Lyons: "Correlation of Paper Coating Quality with Degree of Crystal Perfection of Kaolinite," reprinted from National Research Council Publication 456, 1956, pp. 31–40, and "Further Correlations of Kaolinite Crystallinity with Chemical and Physical Properties," reprinted from Eighth National Conference on Clays and Clay Minerals, Pergamon Press, 1960. In general, poorly stacked kaolins have a higher viscosity than well stacked kaolins. It is well known that a clay having a high viscosity is undesirable for such uses as a paper coating pigment.

To find the "stacking index" or degree of perfection of stacking of a kaolin sample, micrographic methods are impractical because the atomic sheets are very thin— only 7.15 A. units, and most of the individual particles are too small. Investigation by means of an X-ray diffraction spectrometer is possible but is rather slow and interpretation is complex. A practical rapid method of determining comparative degrees of "stacking perfection" is by means of differential thermal analysis (D.T.A.). It has been found that when kaolin is heated strongly, there is a sudden exothermic reaction when the temperature reaches about 980° C., and the magnitude of the reaction is a measure of the stacking perfection of the sample, the well-stacked crystals having a stronger reaction than the poorly-stacked crystals. The relative magnitude of the exothermic reactions can be indicated by peaks traced on a strip chart, the length of a peak being a fair measure of the perfection of stacking. If a given sample of kaolin is adopted as a standard, the ratio of lengths of the exothermic peaks of the standard sample and the unknown sample can for the purposes of this invention be taken as the "stacking index" of the latter.

In certain areas of Georgia there are large deposits of a kind of kaolin (sometimes known as "poorly-stacked") which have attracted little attention because the higher viscosity and relatively poor color of the clay make it unsuitable for use as a paper coating. It is usually a very tough, compact clay and is difficult to blunge into a free slurry. Tests made on this kind of clay show it to be composed almost entirely of very fine particles, i.e., 90% smaller than 2 microns, e.s.d., the particles being often of poorly crystallized appearance.

According to the present invention, to this higher-viscosity clay can be added a substantial amount of another and different-type of higher-viscosity clay with the surprising result that the viscosity of the mixture is considerably lower than that of either component of the mixture. An example of this other type of higher-viscosity clay is a fraction of washed kaolin which has been delaminated in the manner described in U.S. Letters Patent No. 2,904,267. To obtain this delaminated product, the coarse fraction (greater than 2 microns, e.s.d.) of washed clay is brought to a consistency of from 73% to 83% solids, according to the nature of the clay being processed, the mass then being extruded through holes of 7/16 of an inch diameter or less under a pressure of at least 350 pounds per square inch, the extruded clay being then slurried and fractionated to recover the finer particles of such sizes as will be best suited for particular purposes, e.g., 10 microns or less (e.s.d.), a considerable percentage of which will be plate-like in shape, resulting from the delamination of relatively large "stacks" by the intense shearing stresses involved in forcing the stiff clay mass through the holes. The individual platelets of this product are comparatively thin and wide, but the viscosity when made into a concentrated aqueous slurry is high. When mixed with the "poorly-stacked" clay of high viscosity, the viscosity of both ingredients drops sharply as is indicated by the following table.

In making quantitative measurements of viscosity of aqueous clay slurry, a consistency of 71% solids is usually employed as standard procedure. The viscometer spindle which is immersed in the mass is rotated at selected speeds and the resistance to rotation is taken as a measure of the viscosity.

| Poorly-stacked, Percent | Delaminated, Percent | Viscosity at 71% solids (cpe.) | | Disp. Reagent Percent |
|---|---|---|---|---|
| | | 10 r.p.m. | 100 r.p.m. | |
| ---- | 100 | (¹) | ---- | .50 |
| 10 | 90 | 750 | 240 | .50 |
| 20 | 80 | 550 | 175 | .50 |
| 30 | 70 | 490 | 156 | .50 |
| 40 | 60 | 470 | 148 | .50 |
| 50 | 50 | 550 | 160 | .50 |
| 100 | ---- | 1,970 | 470 | .65 |

¹ Off scale.

The foregoing table shows that minimum viscosity is had by blending approximately 40% of poorly-stacked kaolin with about 60% of the delaminated well-stacked clay, although very significant improvements are attained within the range of 10% to 50%.

The valuable properties of brightness, whiteness, uncalendered gloss and calendered gloss are indicated in the following table:

Comparison of optical properties of
A. Delaminated kaolin (well-stacked)
B. Poorly-stacked natural kaolin
C. Blend of 70% delaminated and 30% poorly-stacked
D. Well-stacked natural clay

| Sample | Pigment | | Gloss | | | 1-Sheet Br. | | | 1-Sheet W.I. | | |
|---|---|---|---|---|---|---|---|---|---|---|---|
| | Br. | W.I. | Uncal. | Cal. | Incr. | Uncal. | Cal. | Decr. | Uncal. | Cal. | Decr. |
| Delaminated | 90.3 | 10.2 | 15.0 | 50.0 | 35.0 | 78.8 | 75.2 | 3.6 | 11.0 | 12.9 | 1.9 |
| Poorly stacked, natural | 87.1 | 14.0 | 22.0 | 47.0 | 25.0 | 77.9 | 74.0 | 3.9 | 11.3 | 14.0 | 2.7 |
| Blend | 88.1 | 12.5 | 14.0 | 47.0 | 33.0 | 77.1 | 74.7 | 2.4 | 12.7 | 13.8 | 1.1 |
| Well stacked, natural | 86.4 | 15.5 | 8.5 | 35.0 | 26.5 | 74.6 | 73.2 | 1.4 | 17.5 | 26.3 | 0.3 |

Br.=Brightness; W.I.=Whiteness Index; Uncal.=Uncalendered; Cal.=Calendered; Incr.=Increase; Decr.=Decrease.

The above table is selected as representative of a large number of comparative tests.

Sample A was delaminated kaolin produced by the hereinbefore described method of "superstrusion" and containing approximately 70% fines, i.e., particles of 2 microns or less, equivalent spherical diameter. This sample had a relatively high viscosity.

Sample B was poorly-stacked natural clay having well over 80% fines and a high viscosity.

Sample C was a blend of 70% of the well-stacked A clay and 30% of the poorly-stacked B clay.

Sample D was a well-stacked natural clay having about 80% fines.

The table shows that for certain important uses such as coating for paper, the blend has valuable properties. In the matter of gloss, while its uncalendered value is low, it shows a remarkable increase of gloss when calendered. This signifies that to give it a specified gloss, as is customary in paper-making, a relatively light calendering would suffice. This is an important advantage as heavy calendering or supercalendering is apt to injure the sheet and is therefore objectionable.

Heavy calendering which is often necessary to attain a specified gloss on paper coated with other clays tends to decrease the optical properties of the sheet and to render it "tinny," that is, with a hard, unyielding surface. For good printing, a paper sheet should have a certain degree of surface resilience. This desirable characteristic is present in lightly calendered paper but is deficient in heavily calendered paper. It may be noted that the delaminated sample A shows a similar sharp increase in gloss as a result of calendering, but its high viscosity rules it out for many commercial coating operations for paper, except when blended with poorly-stacked kaolin as described.

Another feature of the blend C is that it loses less brightness than either of its constituents when calendered, and that its brightness, both uncalendered and calendered, is superior to that of the well-stacked natural clay D.

While the poorly-stacked clay hereinbefore referred to is off-color when mined, it has been found that by intensive bleaching, the color condition can be satisfactorily corrected so that when its viscosity is drastically reduced by blending with well-stacked high-viscosity kaolin, it becomes a valuable commercial product suitable for such uses as coating and filling paper, the use of this material contributing to increased whiteness, brightness and easy calendering.

In order to obviate some possible confusion as to terminology, as used in the industry, it may be mentioned that the term "stacks" is used when referring to individual kaolinite particles whose equivalent spherical diameter is greater than about 2μ. Such particles embody a plurality of very small mosaic formations of thin, generally hexagonal-plate crystallites in stacked, face-to-face configuration. These "stacked" entities are a natural form of kaolin particles and should not be confused with "aggregates" which are also relatively large-size "particles"—or "agglomerates" thereof. "Stacks" will not spontaneously delaminate, even upon prolonged soaking in water.

"Aggregates" or "agglomerates" are "crumbs" which are formed—either naturally, or artificially—by the cementing together of originally finer particles. This agglomeration, usually, is caused by cementation of confronting particles by soluble chemical residues or by colloidal gel-like substances during drying. Agglomerates will usually disintegrate upon long soaking under gentle agitation in water.

We claim:

1. A kaolin product consisting of a blend of a high-viscosity well-stacked kaolin with from about 10% to about 50% of a high-viscosity poorly-stacked kaolin, said blend having a viscosity lower than that of either of the ingredients of the blend.

2. A kaolin product as described in claim 1, the poorly-stacked component comprising well over 80% particles less than 2 microns, equivalent spherical diameter.

3. A kaolin product as described in claim 2, the well-stacked component having approximately 70% of mechanically delaminated particles of about 10 microns or less, equivalent spherical diameter.

4. A kaolin product as described in claim 1, the poorly-stacked kaolin and the well-stacked kaolin being present in the proportion of about 40% to 60% by weight.

5. A kaolin product as described in claim 3, the poorly-stacked kaolin and the well-stacked kaolin being present in the proportion of about 40% to 60% by weight.

6. A kaolin product as described in claim 1, the poorly-stacked kaolin containing over 80% fines, the well-stacked kaolin consisting of the fines fraction of a washed kaolin which has been mechanically delaminated and classified, said fraction containing over 70% fines.

References Cited

UNITED STATES PATENTS

| | | | |
|---|---|---|---|
| 2,904,267 | 9/1959 | Lyons | 106—72 |
| 3,034,859 | 5/1962 | Gunn et al. | 23—110.2 |
| 3,106,476 | 10/1963 | Millman et al. | 106—309 |
| 3,274,011 | 9/1966 | Duke | 106—72 |
| 3,301,691 | 1/1967 | Hemstock et al. | 106—72 |
| 3,303,035 | 2/1967 | Hemstock et al. | 106—72 |

JAMES E. POER, *Primary Examiner.*